3,148,215
BIS-(AMINOPROPOXYPHENYL)ALKANES AND
PROCESS FOR PRODUCING THE SAME
John R. Holsten, William A. H. Huffman, and Jack Preston, Decatur, Ala., assignors, by mesne assignments, to Monsanto Company, a corporation of Delaware
No Drawing. Filed Mar. 17, 1960, Ser. No. 15,541
4 Claims. (Cl. 260—570)

This invention relates to the production of novel organic diamine compounds. More particularly, this invention relates to bis-(aminopropoxyphenyl)alkanes and to a process for producing the same.

It is an object of this invention to provide novel and useful diamine compounds.

Another object of this invention is to provide the new compounds, bis(3-aminopropoxyphenyl)alkanes.

A further object is to provide a new and effective method for preparing the aforesaid novel diamine compounds.

Other objects will appear in the description of the invention which follows.

The compounds of this invention may be represented by the following general formula:

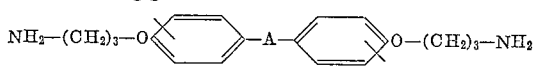

wherein A represents a lower alkylene group. The term "lower alkylene" refers to a lower aliphatic divalent saturated radical. The lower alkylene group can have a straight chain or a branched chain with up to and including eight carbon atoms in the chain. The aminopropoxy groups on the phenyl rings are in the 3,3'-, 4,4'-, or 3,4'-positions. It will be recognized that inert substituents such as lower alkyl radicals can be present on the aromatic rings.

The compounds of this invention are synthesized most conveniently from bis(hydroxyphenyl)alkanes. If such compounds are used as the starting material, the bis(hydroxyphenyl)alkanes are converted first to the corresponding bis(2-cyanoethoxyphenyl)alkanes by the dicyanoethylation thereof. The resulting bis(2-cyanoethoxyphenyl)alkanes are converted to the corresponding diamines novel to the present invention by catalytic hydrogenation thereof.

The bis(4-hydroxyphenyl)alkanes are the preferred starting materials for the compounds of this invention and are synthesized by methods known in the art. One of these diols commonly referred to as bisphenol A can be obtained, for example, by reacting phenol with acetone under appropriate reaction conditions, as is well known. Bisphenol A structurally is 2,2-bis(4-hydroxyphenyl)propane and is the most preferred starting material since it is readily available on the market.

Other bis(hydroxyphenyl)alkanes suitable as the starting material for the preparation of the novel diamine compounds of this invention include 2,2-bis(3-hydroxyphenyl)propane;
2,2-(3-hydroxyphenyl,4-hydroxyphenyl)propane;
bis(4-hydroxyphenyl)methane;
1,1-bis(4-hydroxyphenyl)ethane;
1,1-bis(4-hydroxyphenyl)propane;
1,1-bis(4-hydroxyphenyl)butane;
1,1-bis(4-hydroxyphenyl)heptane;
2,2-bis(4-hydroxyphenyl)butane;
2,2-bis(4-hydroxyphenyl)pentane;
2,2-bis(4-hydroxyphenyl)heptane;
2,2-bis(4-hydroxyphenyl)octane;
3,3-bis(4-hydroxyphenyl)heptane;
2,2-bis(3-methyl,4-hydroxyphenyl)propane;
2,2-bis(3-isopropyl,4-hydroxyphenyl)propane;

and the like. The corresponding diamines produced from the just mentioned bis(hydroxyphenyl)alkanes are 2,2-bis[3-(3'-aminopropoxy)phenyl]propane;
2,2-[3-(3'-aminopropoxy)phenyl,4-(3'-aminopropoxy)phenyl]propane;
bis[4-(3'-aminopropoxy)phenyl]methane;
1,1-bis[4-(3'-aminopropoxy)phenyl]ethane;
1,1-bis[4-(3'-aminopropoxy)phenyl]propane;
1,1-bis[4-(3'-aminopropoxy)phenyl]butane;
1,1-bis[4-(3'-aminopropoxy)phenyl]heptane;
2,2-bis[4-(3'-aminopropoxy)phenyl]butane;
2,2-bis[4-(3'-aminopropoxy)phenyl]pentane;
2,2-bis[4-(3'-aminopropoxy)phenyl]heptane;
2,2-bis[4-(3'-aminopropoxy)phenyl]octane;
3,3-bis[3-(3'-aminopropoxy)phenyl]heptane;
2,2-bis[3-methyl,4-(3'-aminopropoxy)phenyl]propane;
2,2-bis[3-isopropyl,4-(3'-aminopropoxy)phenyl]propane;

and the like.

The bis(hydroxyphenyl)alkanes used as the starting materials readily form dicyanoethylated derivatives that are novel insofar as is known. Obviously the particular bis(hydroxyphenyl)alkane used will be determined by the diamine desired. The dicyanoethylated derivatives can be formed by reacting the selected bis(hydroxyphenyl)alkanes with acrylonitrile. The reaction can be carried out by contacting the selected bis(hydroxyphenyl)alkane with acrylonitrile, preferably in the presence of a catalytic amount of a suitable basic catalyst stable under the reaction conditions. Such types of catalyst that are preferably present during the dicyanoethylation to increase the speed of reaction include alkali metal alkoxides, for example sodium tertiary butoxide. Among other cyanoethylation catalysts are Triton B, pyridine, quinoline, N,N-dimethylaniline, and sodium or potassium tertiary amylate.

It has also been found advantageous to include in the reaction mixture a suitable quantity of material such as cuprous chloride which tends to inhibit the self-polymerization of acrylonitrile. Generally speaking, the cyanoethylation reaction can be carried out in conventional equipment, such as in an autoclave. The temperature and pressure of the reaction mixture composed of the selected bis(hydroxyphenyl)alkane, acrylonitrile, catalyst and polymerization inhibitor, are raised to initiate the reaction between the bis(hydroxyphenyl)alkane and acrylonitrile and to cause the reaction to go to completion within a reasonable length of time. The exact temperatures and pressures employed will depend somewhat upon the particular bis(hydroxyphenyl)alkane and the relative quantities of the materials in the reaction mixture; however, the reaction mixture, for best results, should be maintained mainly in a liquid phase. The polymerization inhibitor need not be totally soluble in the reaction mixture.

Obviously, the molar quantity of acrylonitrile employed should be at least twice that of the bis(hydroxyphenyl)alkane since two moles of acrylonitrile will react with one mole of the bis(hydroxyphenyl)alkane. Acrylonitrile is preferably employed in substantial excess of that required for a stoichiometric dicyanoethylation reaction, although such excess is not critical for optimum yields of the intermediate dinitriles. Excess acrylonitrile facilitates the reaction and is preferred in that the bis(hydroxyphenyl)alkanes that are normally solids will tend to dissolve in the excess acrylonitrile thus providing an advantageous reaction medium. For example, when twelve or more moles of acrylonitrile are employed per mole of bis(hydroxyphenyl)alkane in one method, excellent results are obtained. If desired, the dicyanoethylation reaction can be carried out in the presence of a suitable inert organic solvent. Examples of suitable solvents are diethyl ether, benzene, dioxane, pyridine, cyclohexane, and the like.

The reaction can be carried out under anhydrous conditions or in the presence of some water. After the reaction goes to completion, the thus-produced dinitrile, bis[(2-cyanoethoxy)phenyl]alkane, is separated and purified before the dinitrile is reduced to the desired diamine. These separation and purification steps are accomplished by conventional techniques. For instance, the dinitriles can be isolated before the final hydrogenation by extraction, distillation, or other suitable means known in the art. In general, it is desirable to purify the dinitriles and the diamines by distillation.

The intermediate dinitriles are subsequently hydrogenated to diamines. Various catalysts and reaction conditions can be employed. Stated another way more specifically, the bis(3-aminopropoxyphenyl)alkanes of the present invention can be produced by catalytically reducing the corresponding bis[(2-cyanoethoxy)phenyl]alkanes. Reduction can be effected by the use of hydrogen gas under hydrogenating conditions of elevated temperatures and pressures. In general, the hydrogenation reaction can be carried out in the usual hydrogenation equipment and with the usual hydrogenation techniques for converting dinitriles to diamines. Temperatures of 80 to 150° C. can be used, although a temperature range of 85 to 100° C. is preferred. Pressures of 2500 to 5000 p.s.i.g. are feasible, although best results have been obtained with pressures ranging from 3000 to 3500 p.s.i.g. The exact temperatures and pressures used depend somewhat on the particular dinitrile being hydrogenated to its corresponding diamine. Ammonia usually should be employed during the hydrogenation to minimize the formation of polyamines due to inter-molecular loss of ammonia. The reduction reaction is catalyzed by the use of hydrogenation catalysts such as Raney nickel or Raney cobalt and others. The amount of catalyst is not critical. After the desired hydrogenation is complete, the thus-produced bis[(3-aminopropoxy)phenyl]alkane is separated by the usual processes. Ordinarily, the separation is most conveniently accomplished by distillation.

The following examples are given for the purpose of illustrating the invention, the parts being parts by weight unless otherwise indicated.

*Example I*

2,2-bis[4-(3'-aminopropoxy)phenyl]propane was prepared.

High purity bisphenol A which chemically, as indicated above, is 2,2-bis(4-hydroxyphenyl)propane was added to a laboratory-type metal reaction vessel or autoclave. The bisphenol A had a melting point between 160.5–162° C. The vessel was of the type adapted for conducting high pressure reactions therein and had a capacity of two liters. The vessel was equipped with means for heating and means for stirring the contents therein, a pressure gauge, and a safety blow-out valve. The amount of bisphenol A added was 91.2 grams (0.4 mole). Dry sodium tertiary-butoxide was added to the vessel in the amount of 0.8 gram, the function of this basic compound being to catalyze the dicyanoethylation reaction to be conducted in the vessel. Four grams of cuprous chloride for stabilizing the acrylonitrile subsequently added was also placed in the reaction vessel. The ingredients thus-added to the vessel were mixed well. Then, relatively cold, unstabilized acrylonitrile was poured slowly and cautiously onto the resulting mixture. A notably vigorous reaction occurred when the acrylonitrile came into contact with the catalyst; but the reaction subsided rather quickly. Addition of the acrylonitrile was continued until 400 ml. (6+ moles) thereof had been added. The reaction vessel containing the ingredients just mentioned was closed to the atmosphere. The reaction mixture was stirred and heated to 100° C. during one hour and then stirred and heated at 104±4° C. for an additional 17.5 hours under autogenous pressures of 13.5–20.0 p.s.i.g. to form the intermediate dinitrile. Thereafter the reaction mixture was cooled to room temperature.

Unreacted acrylonitrile was removed from the reaction mixture by subjecting the mixture to a sufficiently reduced pressure to evaporate the acrylonitrile therefrom. The acrylonitrile so removed was collected for re-use in a flask partly immersed in a solid $CO_2$-acetone bath. The residue was dissolved in 500 ml. of chloroform, and the resulting mixture was filtered with suction through a Buchner funnel. The filtrate containing the dinitrile produced was washed successively with five 100-ml. portions of 5% aqueous sodium hydroxide solution, two 125-ml. portions of 5% hydrochloric acid and one 250-ml. portion of water. The washed organic solution was dried over anhydrous sodium sulfate, filtered and subjected to conditions so as to distill the chloroform therefrom. The residue was a buff-colored solid that weighed 98.6 grams. The residue was dissolved in hot ethanol and the hot solution was contacted with activated carbon. After being filtered, the solution was cooled to precipitate the dinitrile. Purification by the recrystallization technique with ethanol was repeated three additional times. The precipitated material was the dinitrile, 2,2-bis[4-(2'-cyanoethoxy)phenyl]propane, which had a melting point of 78–79° C. and a slightly buff color. The yield was 60% of the theoretical yield. This dinitrile material was combined with like material similarly produced during additional runs. The combined samples (about 185 grams) were recrystallized twice from 700-ml. portions of the carbon tetrachloride-ethanol azeotrope (84% $CCl_4$ and 16% ethanol by weight). The purified dinitrile weighed 172.5 grams and exhibited a melting point of 80–80.5° C. Analysis of the dinitrile showed that it was composed of 75.72% carbon, 6.41% hydrogen, and 8.28% nitrogen. The calculated amounts of these elements in 2,2-bis[4-(2-cyanoethoxy)phenyl]propane are 75.42% carbon, 6.63% hydrogen, and 8.38% nitrogen.

One hundred and sixty-four grams (0.49 mole) of the dinitrile produced was dissolved in 250 ml. of 1,2-dimethoxy-ethane, and the resulting solution was charged to a steel hydrogenation reactor of 1410-ml. capacity, along with 25 grams of freshly-prepared Raney cobalt catalyst and 97 grams of ammonia. The reactor was jacketed for heating and cooling the contents therein and was equipped with efficient agitating means. The reactor was closed to the atmosphere, and hydrogen was added to the stirred mixture to pressurize the reactor. The temperature was adjusted, and the hydrogenation proceeded smoothly between 84–118° C. and at a pressure of 2900–3200 p.s.i.g. Hydrogen was added to the reactor as needed to maintain the pressure. After hydrogenation was complete, the catalyst was removed from the cooled reaction mixture by filtration under a nitrogen blanket. The solvent was then removed under reduced pressure, leaving 163 grams of a viscous caramel-colored liquid. Distillation of the liquid through a simple Claisen-type distilling head gave 138 grams of a colorless viscous liquid which was identified as 2,2-bis[4-(3'-aminopropoxy)phenyl]propane. This liquid displayed a boiling point of 216–217° C. at 0.4 mm. Hg absolute pressure. There was no forecut and the residue was composed of 22 grams of a dark viscous liquid that probably was largely the desired diamine. No signs of decomposition of the diamine during the distillation thereof were noted, indicating that the novel diamine is heat stable. A sample of the distilled diamine had the following analyses: carbon—73.79%; hydrogen—8.22%; and nitrogen—8.12%. The calculated percentages of these elements in 2,2-bis[4-(3'-aminopropoxy)phenyl]propane are: carbon—73.65%; hydrogen—8.83%; and nitrogen—8.18%.

*Example II*

Bis[4 - (3' - aminopropoxy)phenyl]methane was prepared.

Sixty grams of bis(4-hydroxyphenyl)methane (M.P.

159–160° C.), 0.6 gram of sodium t-butoxide catalyst, and 3.0 grams of cuprous chloride stabilizer was added to the reaction vessel described above Example I. The ingredients thus-added to the vessel were mixed well. Then, relatively cold, unstabilized acrylonitrile was poured slowly and cautiously onto the resulting mixture. Notably vigorous reaction occurred when the acrylonitrile came into contact with the catalyst, but the reaction subsided rather quickly. Addition of the acrylonitrile was continued until 300 ml. thereof had been added. The reaction vessel containing the ingredients just mentioned was closed to the atmosphere. The reaction mixture was stirred and heated to 100° C. during one half hour and then heated and stirred at 104 ± 4° C. for an additional 17.5 hours under autogenous pressures of 20–23 p.s.i.g. to form the intermediate dinitrile. Thereafter, the reaction mixture was cooled to room temperature.

Unreacted acrylonitrile was removed from the reaction mixture by subjecting the mixture to a sufficiently reduced pressure to evaporate the acrylonitrile therefrom. The acrylonitrile so removed was collected for re-use in a flask partly immersed in a solid $CO_2$-acetone bath. The residue was taken up in 425 ml. of chloroform, and the resulting mixture was filtered with suction through a Buchner funnel. The filtrate was washed successively with five 100-ml. portions of 5% aqueous sodium hydroxide solution, five 100-ml. portions of 5% hydrochloric acid and two 250-ml. portions of water, the last water washing being neutral to "pHydrion" paper. The washed organic solution was then dried over anhydrous sodium sulfate, filtered and stripped of solvent under reduced pressure. The resulting residue was recrystallized successively from 125 ml. of 4:1 dioxane-water, 110 ml. of dioxane and 50 ml. of dioxane, yielding 30.3 grams of the dinitrile bis[4-(2'-cyanoethoxy)phenyl]methane having a melting point of 115.5–116° C. (sinters, 115° C.). Concentration of the combined mother liquors to dryness and recrystallization of the residue, first from 65 ml. of ethyl acetate and then from 60 ml. of 5:5:2 dioxane-ethanol-water solution yielded an additional 11.0 grams of the desired dinitrile. The yield of dinitrile, based on unrecovered bis (4-hydroxyphenyl) methane, was 64.2%. Analysis of the dinitrile produced showed that it was composed of 8.99% of nitrogen. The calculated amount of nitrogen in bis[4-(2'-cyanoethoxy)phenyl]methane is 9.15%.

Thirty and three-tenths grams of the dinitrile produced was dissolved in 500 ml. of 1,2-dimethoxyethane. The resulting solution was charged to the hydrogenation reactor, as in the prior example, along with 10 grams of freshly-prepared Raney cobalt catalyst and 115 gms. of ammonia. The reactor was closed, and hydrogen was added to the stirred mixture to pressurize the reactor. The temperature was adjusted, and the hydrogenation proceeded smoothly between 84–116° C. in a pressure range of 3280–3460 p.s.i.g. Hydrogen was added to the reactor as needed to maintain the pressure. After hydrogenation was complete, the catalyst was removed from the reaction mixture by filtration under a nitrogen blanket; and the solvent was removed from the filtrate under reduced pressure. The resulting residue was flash distilled at 0.5 mm. of Hg absolute pressure, with all distillate boiling up to 240° C. being collected. This distillate was redistilled through a 4" Vigreux Column (Mini-lab), and 19.5 grams of distillate boiling at 219–222° C. at 0.5 mm. of Hg absolute pressure was collected. There were no indications of decomposition during the distillation; and the clear, colorless distillate solidified slowly on standing at room temperature. The amount of purified diamine thus-produced represents a 62.1% yield based on the dinitrile compound charged to the hydrogenation reactor. Analysis of the diamine produced showed that it was composed of 7.70% of nitrogen. The calculated amount of nitrogen in bis[4-(3'-aminopropoxy)phenyl]methane is 8.91. The low nitrogen analysis in the diamine produced was probably due to the presence of some carbonate impurity.

The diamine was reacted with terephthaloyl chloride by the emulsion polymerization technique to produce a highly polymeric polycarbonamide. Cold drawable filaments having excellent textile properties were formed from a melt of the polymer.

Likewise, other bis[4-(3'-aminopropoxy)phenyl] alkanes are prepared by the catalytic hydrogenation of other corresponding bis[4-(2'-cyanoethoxy)phenyl] alkanes. The latter compounds are prepared by the cyanoethylation of the corresponding bis(4-hydroxyphenyl)alkanes by methods analogous to those illustrated.

The diamine compounds falling within the scope of the present invention are of value as starting materials for valuable resinous products. For example, 2,2-bis [4-(3'-aminopropoxy)phenyl] propane of Example I and terephthaloyl chloride were reacted together by an interfacial polymerization technique to produce a polymeric terephthalamide of fiber-forming quality. Fibers produced from the polymer exhibited excellent light and heat stability. The compounds made according to the invention are of value as intermediate products for preparing effective compounds for numerous technical purposes.

It will be obvious to those skilled in the art that many modifications may be made within the scope of the present invention without departing from the spirit thereof, and the invention includes such modification. For example, while the reactions have been described as involving batchwise operation, it will be appreciated that a continuous method likewise can be employed advantageously.

What is claimed is:
1. A compound having the structure:

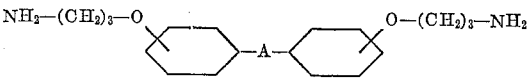

wherein A is a lower alkylene radical containing from 1 to 8 carbon atoms and the aminopropoxy radicals are in a position selected from the group consisting of 3,3'-, 4,4'- and 3,4'-.

2. The compound having the structure:

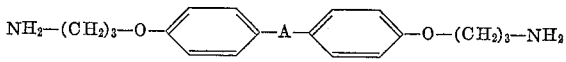

wherein A is a lower alkylene radical containing from 1 to 8 carbon atoms.

3. The compound 2,2-bis[4-(3'-aminopropoxy)phenyl] propane.

4. The compound bis[4-(3'-aminopropoxy)phenyl] methane.

References Cited in the file of this patent

UNITED STATES PATENTS

| | | |
|---|---|---|
| 2,500,942 | Hager | Mar. 21, 1950 |
| 2,701,263 | Wielicki et al. | Feb. 1, 1955 |
| 2,703,324 | Binkley et al. | Mar. 1, 1955 |
| 2,939,862 | Caldwell et al. | June 7, 1960 |
| 3,076,819 | Heise | Feb. 5, 1963 |

FOREIGN PATENTS

| | | |
|---|---|---|
| M.18,458 | Germany | Nov. 3, 1955 |
| 1,056,144 | Germany | Apr. 30, 1959 |

OTHER REFERENCES

Lowe et al.: "Jour. Chem. Soc." (London), pages 3286 to 3292 (1951).

Benoit et al.: "Bull Soc. Chim,," pages 890 to 895 (1951).

Adams et al.: "Organic Reactions," vol. 5, page 89 (1949).